United States Patent [19]

Buchholz et al.

[11] Patent Number: 5,562,961
[45] Date of Patent: Oct. 8, 1996

[54] CO-VULCANIZED COMPOUND PROFILE OF THERMOPLASTIC MATERIAL AND ELASTOMERIC MATERIAL

[75] Inventors: Hans-Volker Buchholz; Alistair Hill, both of Hildesheim, Germany

[73] Assignee: Meteor Gummiwerke K. H. Bädje GmbH & Co., Bockenem, Germany

[21] Appl. No.: 362,468

[22] PCT Filed: Mar. 19, 1994

[86] PCT No.: PCT/EP94/00867

§ 371 Date: Dec. 29, 1994

§ 102(e) Date: Dec. 29, 1994

[87] PCT Pub. No.: WO94/25245

PCT Pub. Date: Nov. 10, 1994

[30] Foreign Application Priority Data

Apr. 30, 1993 [DE] Germany .................. 43 14 191.9

[51] Int. Cl.⁶ .................. E06B 7/16; B32B 27/08
[52] U.S. Cl. .................. 428/36.5; 49/490.1; 49/492.1; 156/309.3; 264/173.17; 264/177.18; 428/36.8; 428/36.91; 428/138; 428/515; 428/517
[58] Field of Search .................. 264/171, 236, 264/177.17, 177.18, 177.19, 177.20, 173.17; 425/131.1, 462; 49/490.1, 492; 296/93; 156/309.3; 428/517, 521, 36.5, 36.8, 36.91, 138, 515

[56] References Cited

U.S. PATENT DOCUMENTS

| | | | |
|---|---|---|---|
| 4,187,270 | 2/1980 | Bartrum | 264/177.16 |
| 4,381,273 | 4/1983 | Azzola | 264/173 |
| 4,595,546 | 6/1986 | Wheeler, Jr. | 264/236 |
| 5,137,675 | 8/1992 | Rabe | 264/177.16 |
| 5,256,361 | 10/1993 | Keys | 264/177.19 |
| 5,267,846 | 12/1993 | Miyama et al. | 264/177.16 |
| 5,334,458 | 8/1994 | Powers et al. | 156/244.11 |
| 5,415,822 | 5/1995 | Cook | 264/177.18 |

FOREIGN PATENT DOCUMENTS

| | | | |
|---|---|---|---|
| 0650318 | 4/1992 | Australia | 425/131.1 |
| 0209453 | 1/1987 | European Pat. Off. . | |
| 0501037 | 9/1992 | European Pat. Off. . | |
| 0528560 | 2/1993 | European Pat. Off. . | |
| 2310207 | 1/1977 | France | 425/131.1 |
| 2572678 | 5/1986 | France . | |
| 2059496 | 6/1972 | Germany . | |
| 3118429 | 11/1982 | Germany . | |
| 3435939 | 3/1986 | Germany . | |
| 3503200 | 5/1986 | Germany | 425/131.1 |
| 3627537 | 2/1988 | Germany . | |
| 3835211 | 10/1988 | Germany . | |
| 3737891 | 5/1989 | Germany . | |
| 57-43849 | 3/1982 | Japan | 264/171 |
| 61-93222 | 6/1986 | Japan . | |
| 62-205132 | 9/1987 | Japan | 156/244.11 |
| 214117 | 1/1990 | Japan . | |
| 4353421 | 12/1992 | Japan . | |
| 524091 | 2/1993 | Japan . | |
| 557820 | 3/1993 | Japan . | |

OTHER PUBLICATIONS

Japanese Abstract vol. 5, No. 158 (M–091), "Preparation of Hose" Jul. 1981.
Japanese Abstract vol. 17, No. 368 (M–1443), "Manufacture of Weatherstrip" Sep. 1993.
Gummibereifung Jun. 1988, pp. 48 and 50 "Gummi–ein Werkstoff nach MaB".

*Primary Examiner*—Jeffery R. Thurlow
*Attorney, Agent, or Firm*—Synnestvedt & Lechner

[57] ABSTRACT

A compound profile of thermoplastic plastics material and elastomeric material. The thermoplastic plastics material and elastomeric material are chemically bonded by co-vulcanization. A coupling material can be used to promote the chemical bonding.

9 Claims, 7 Drawing Sheets

CO-VULCANIZED COMPOUND PROFILE OF THERMOPLASTIC MATERIAL AND ELASTOMERIC MATERIAL

BACKGROUND OF THE INVENTION

The invention relates to a compound profile formed from a thermoplastic plastics material and an elastomeric material. More particularly, the invention relates to such compound profiles wherein the thermoplastic plastics material and elastomeric material are bonded by co-vulcanization.

In EP 0528560 A1 a thermoplastic plastics material on the one hand and an elastomeric material on the other hand are fed into a multi-component extrusion head and from this a combination is produced by co-extrusion. This co-extruded product is vulcanized immediately thereafter and is cooled. The plastics material eventually forms thin layers having a low coefficient of friction on those surface regions of a weather sealing strip which come into contact with a movable side window of a motor vehicle.

From EP 0501037 A2 it is known to feed the extrusion head of an elastomer extruder with a reactive urethane hot melt resin composition. The result is the same low-friction thin layers on those surface regions of a weather sealing strip which are arranged to come into contact with the side window of a motor vehicle.

Another known process of the type first referred to above (DE 37 37 891 A1) uses particular types of rubber and thermoplastic molding materials as elastomeric materials. It is to be noted that operating according to the two-stage extrusion process is expensive in terms of both time and labor.

DE 34 35 939 C1 shows that it is known per se in the treatment of elastomeric materials to use two shear head extruders which feed into a common extrusion head.

From DE-PS 2 059 496 is known an apparatus for the plastification of plastics material, particularly in an injection molding machine, in which two independently operating devices are provided for the production of heat for the plastification process. One of these devices is a shear device formed by a rotating core and supplying shearing heat.

From DE 31 18 429 A1 there is known a buffer strip of foamed polyurethane or polyvinyl chloride which is adhered by a pressure-sensitive adhesive coating on the one hand to a profile member of thermoplastic material and on the other hand to a liner.

From DE 38 35 211 A1 it is known to extrude from a common extrusion head made from a U-shaped clamping strip of hard rubber, a complete envelope around the clamping strip and with lips of soft rubber and a sealing tube of expanded rubber. The compound profile finally runs through a heating station and a hot air zone which completes the vulcanization.

From DE 36 27 537 A1 (embodiment shown in FIG. 1) it is known to extrude (embodiment shown in FIG. 3) on to an edge zone of a pivotable motor vehicle quarterlight a U-shaped profile strip of a polyurethane-based adhesive material with a central web. The profile strip includes an undercut groove into which a complementary retaining section of a push-in sealing profile can be pressed so as to be held there by the shape.

SUMMARY OF THE INVENTION

It is the object of the present invention to broaden the range of application of the process first mentioned above.

The invention provides a compound profile having a thermoplastic plastics material profile section and an elastomeric profile section of soft rubber. The thermoplastic and elastomeric sections are chemically bonded by a process of co-vulcanization. One embodiment of the invention provides a coupling material disposed between the thermoplastic and elastomeric sections to promote the chemical bond. It can be used if the desired chemical bond cannot be sufficiently achieved without the additional coupling layer of bonding material.

Another embodiment provides an additional elastomeric profile section of expanded rubber vulcanized to the elastomeric profile section of soft rubber.

By the means disclosed herein, it is possible to manufacture compound profiles of thermoplastic plastics material and elastomeric material in a cost-effective way and with continuous high qualitative values. The invention is particularly suited to the manufacture of sealing profiles in which, until now, fixing rails of metal have served as holders for the elastomeric profile parts anchored thereon. This latter structure is expensive and is comparatively difficult to manipulate in the assembly process. The present invention permits the metallic fixing rails to be replaced by better and more suitable profile parts of plastics material, and the production of compound profiles of plastics material and elastomeric material in a cost-effective way in a combined extrusion process. In this way one avoids in particular the need for a subsequent anchoring of the elastomeric profile parts with a metallic fixing rail. Plastics material and elastomeric material are, according to the invention, fixed to one another instead by chemical bonding during the common extrusion. This has a particularly favorable effect on the operating parameters of each component of the compound profile. The plastics material is on the one hand calibrated and on the other hand is cooled down to the temperature appropriate for the subsequent common extrusion with the elastomeric material from the multi-component extrusion head. One can use for example one to three different elastomeric components, for example expanded rubber or soft rubber in different hardnesses. These elastomeric components are extruded into the multi-component extrusion head and are jointly extruded from the multi-component extrusion head with the at least one plastics material component. For the plastics material, the treatment or softening temperature of 180° to 300° C. is preferred. The cross-linking can be carried out in a manner known per se in a hot air or UHF installation or in a salt bath or in a fluid bed.

Basically, the present invention is suitable not only for the creation of particularly favorable sealing profiles. In particular, for the motor vehicle industry, one can produce for example by this means in a favorable way rainwater strips and bodywork seals for use under the bonnet of motor vehicles. In these cases the one component of thermoplastic plastics material assumes the function of the previously used metallic fixing rails.

Further features and advantages of the invention will become apparent from the following description of a number of embodiments of apparatus and manufactured products in accordance with the invention, which are described with reference to the drawings.

DETAILED DESCRIPTION

Figure 1:
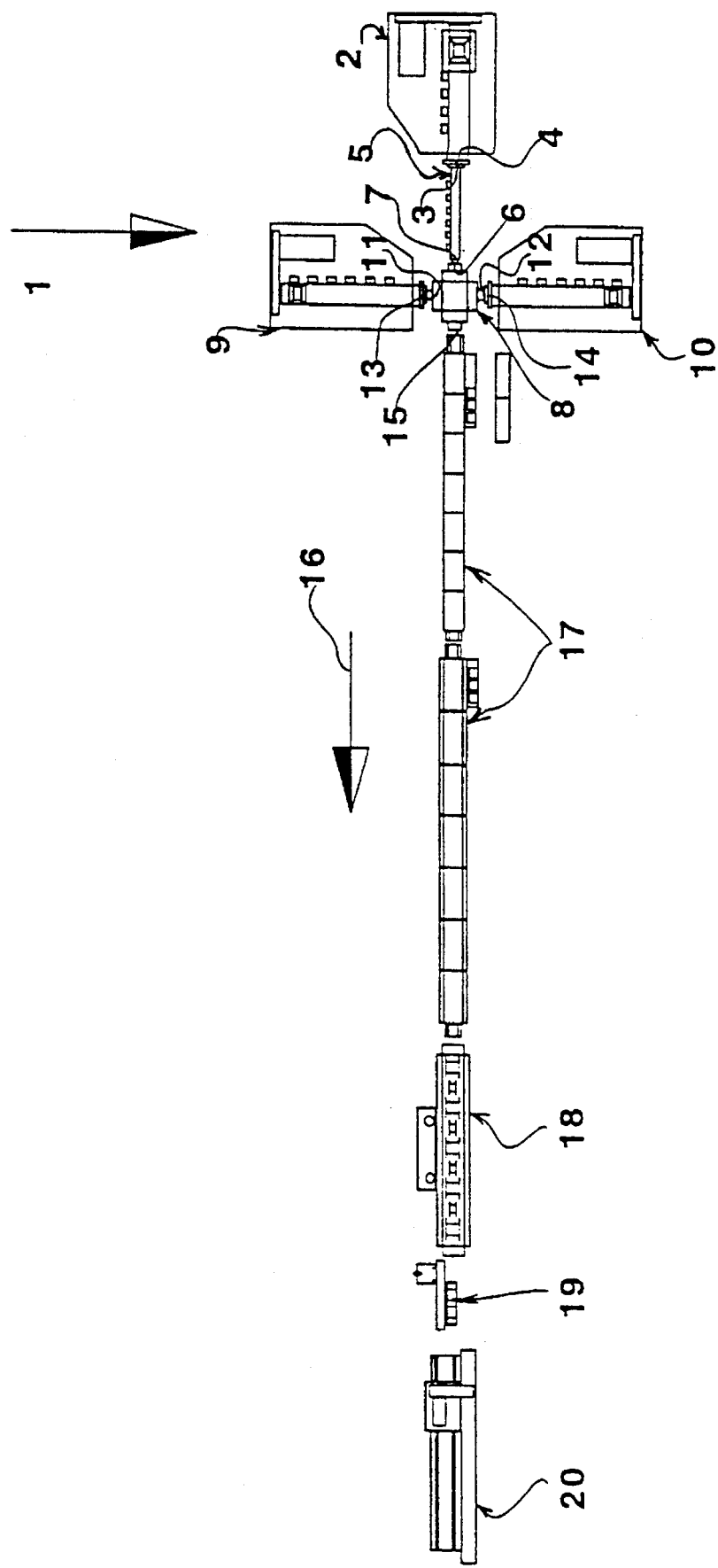
FIG. 1 is a plan view of a schematic representation of a first embodiment of an apparatus for making a product in accordance with the invention.

FIG. 1 shows an apparatus 1 for the production of a chemical bond between thermoplastic plastics material on the one hand and elastomeric material on the other hand by co-vulcanization.

The apparatus 1 comprises a plastics material extruder 2 whose outlet 3 is connected to an inlet 4 of a calibrating and cooling region 5. An outlet 6 of the calibrating and cooling region 5 is connected to an inlet 7 of a multi-component extrusion head 8.

The apparatus 1 further includes two elastomer extruders 9 and 10, whose outlets 11 and 12 are respectively connected to further inlets 13 and 14 of the multi-component extrusion head 8.

A compound profile consisting of plastics material and elastomeric material, whose components are chemically bonded to each other, is continuously extruded from an outlet 15 of the multi-component extrusion head 8. The compound profile moves in the direction of an arrow 16, firstly through a cross-linking zone 17 and thereafter through a cooling zone 18, in order then to be passed via a conveyor track 19 to a separating unit 20. In the separating unit 20 the endless compound profile is cut off in required section lengths.

In all the Figures of the drawings the same parts are provided with the respective same reference numerals.

Figure 2:
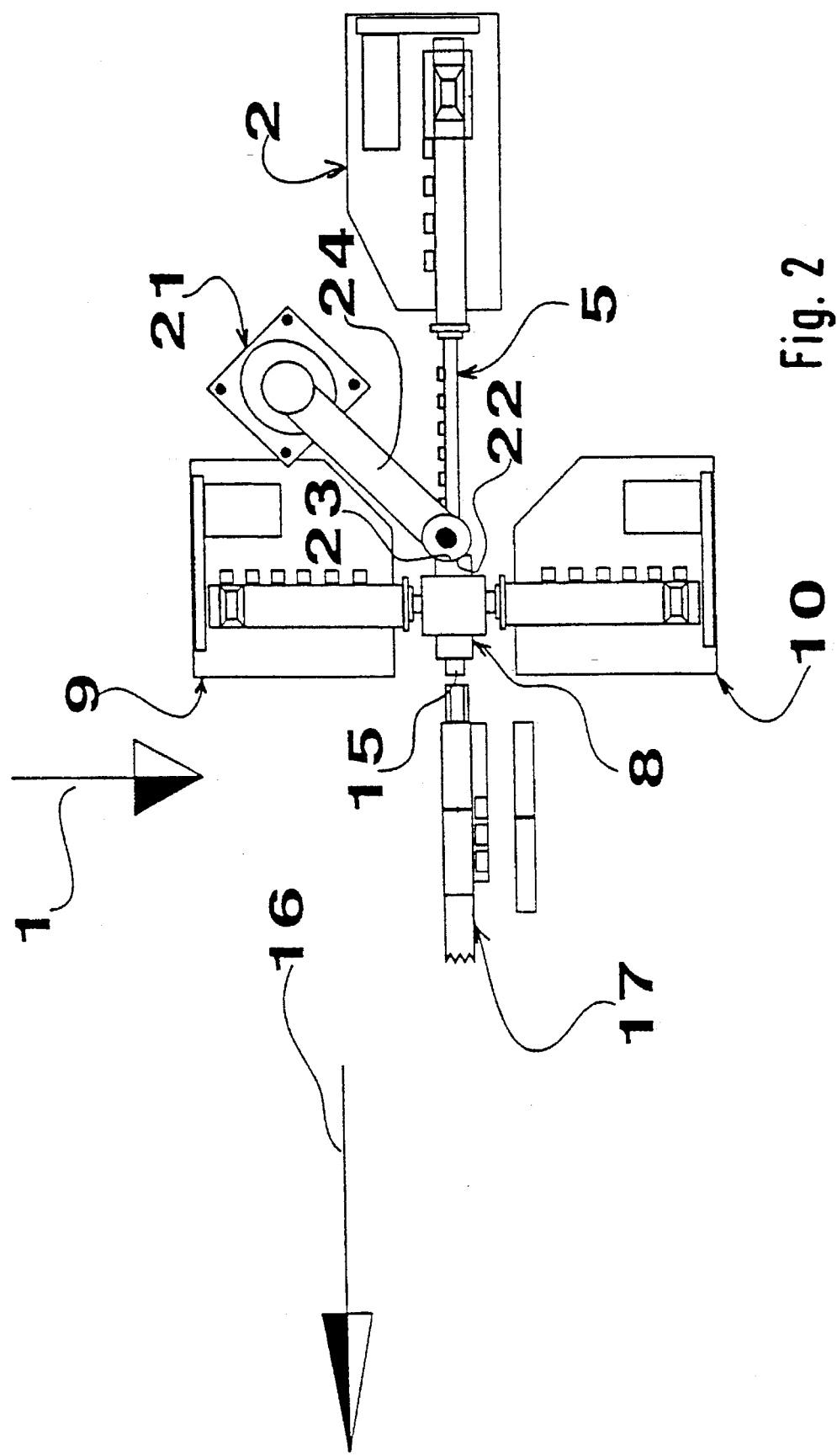
FIG. 2 is a plan view, on an enlarged scale as compared with FIG. 1, of part of a second embodiment of an apparatus for making a product in accordance with the invention.
Figure 5:
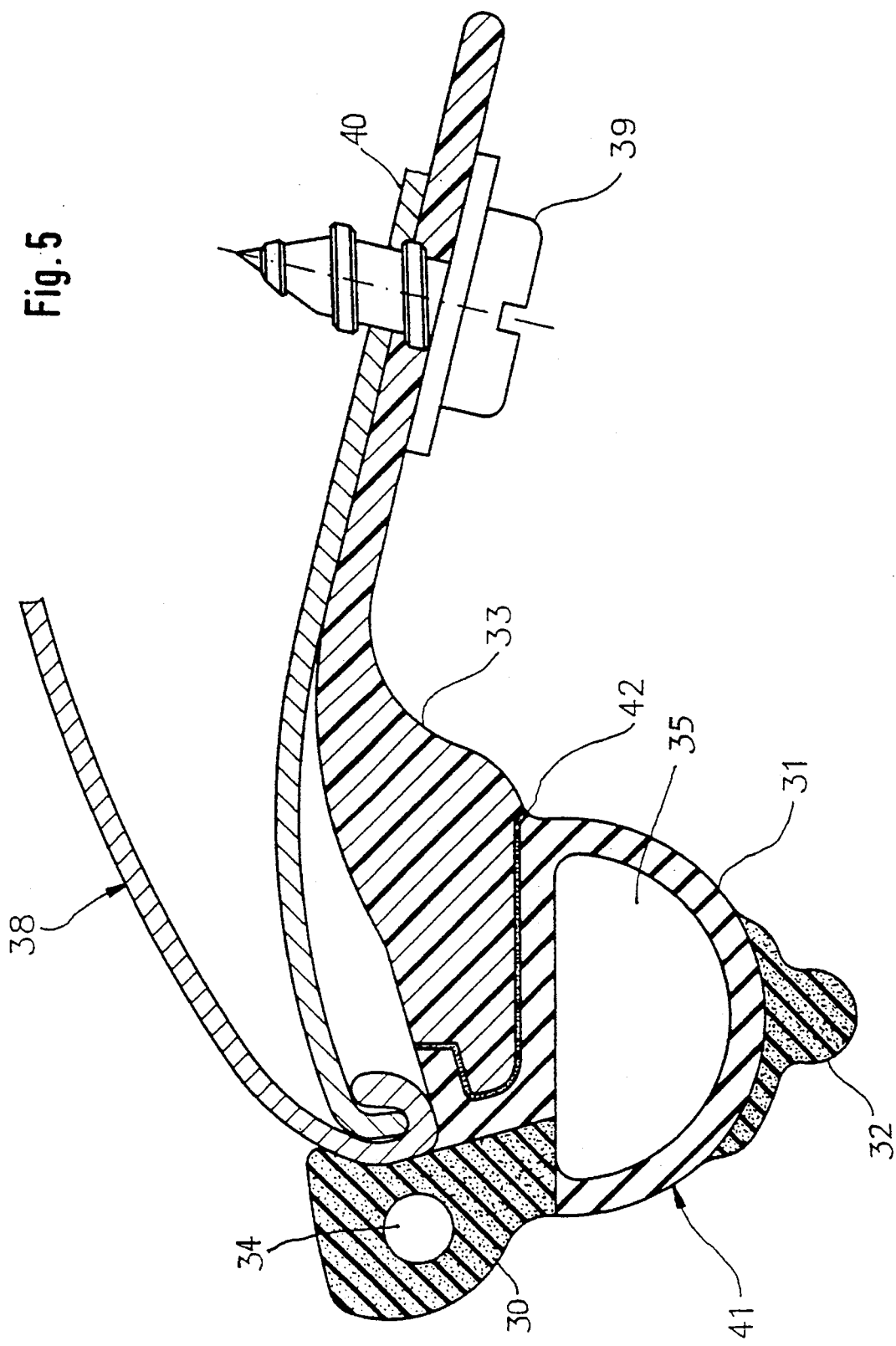
FIG. 5 is a cross-sectional view through a further manufactured product in its installed state.
Figure 7:
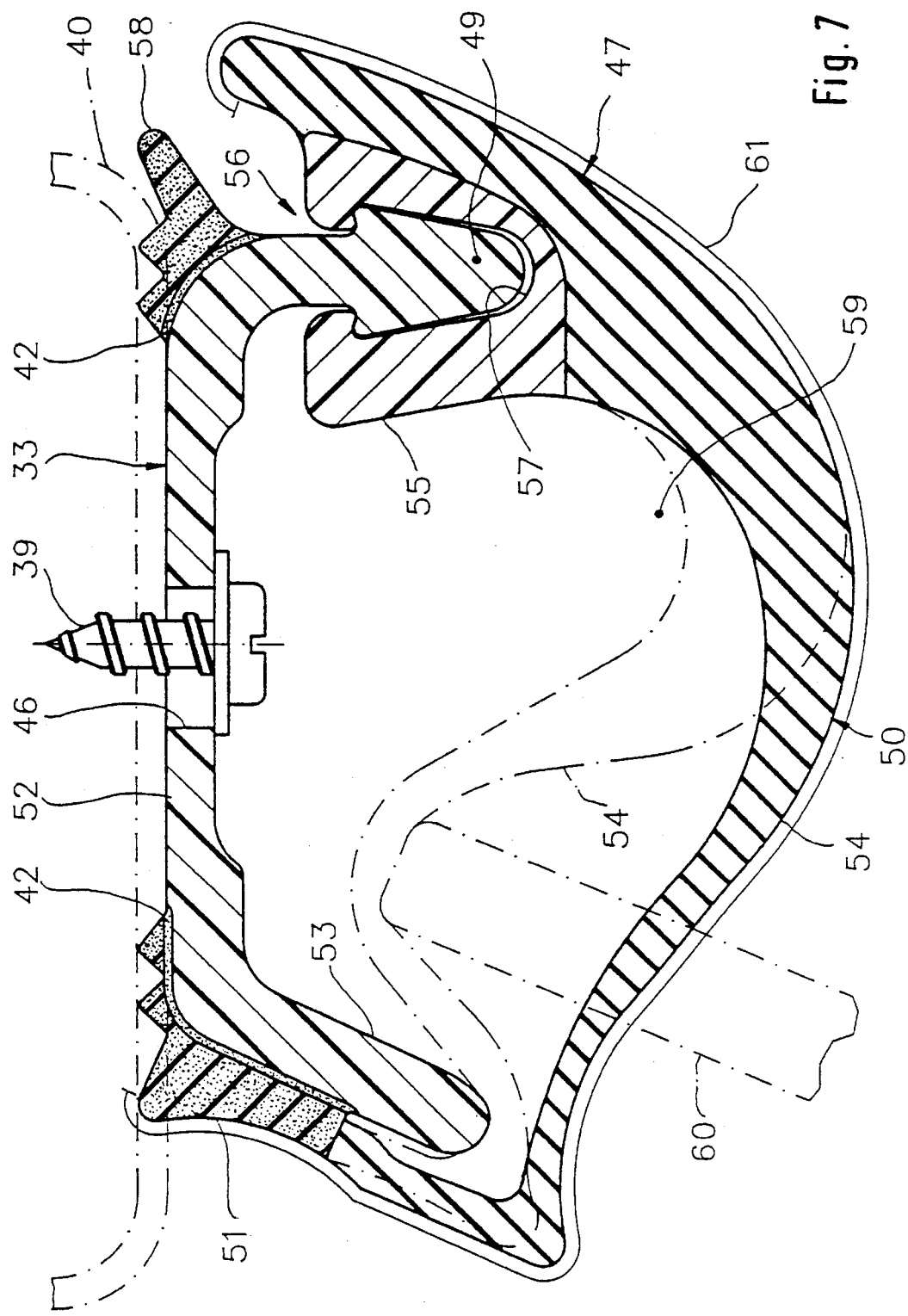
FIG. 7 is a cross-sectional view through a fourth embodiment of manufactured product.

In the embodiment shown in FIG. 2, the apparatus 1 includes, in addition to the components shown in FIG. 1, a feed device 21 for a coupling material which promotes the chemical bond between the plastics material and the elastomeric material (compare for example 42 in FIGS. 5 and 7). An outlet 22 of the feed device 21 is connected to a further inlet 23 of the multi-component extrusion head 8. In this way, the coupling material can be introduced directly into the multi-component extrusion head 8 and be fed between the surfaces of the plastics material and of the elastomeric material which are to be bonded to one another. For reasons of space, the feed device 21 can be arranged spatially above the extruders 2, 9 and 10. An outlet passage 24 of the feed device 21 then extends at an angle downwards to the inlet 23.

Figure 3:
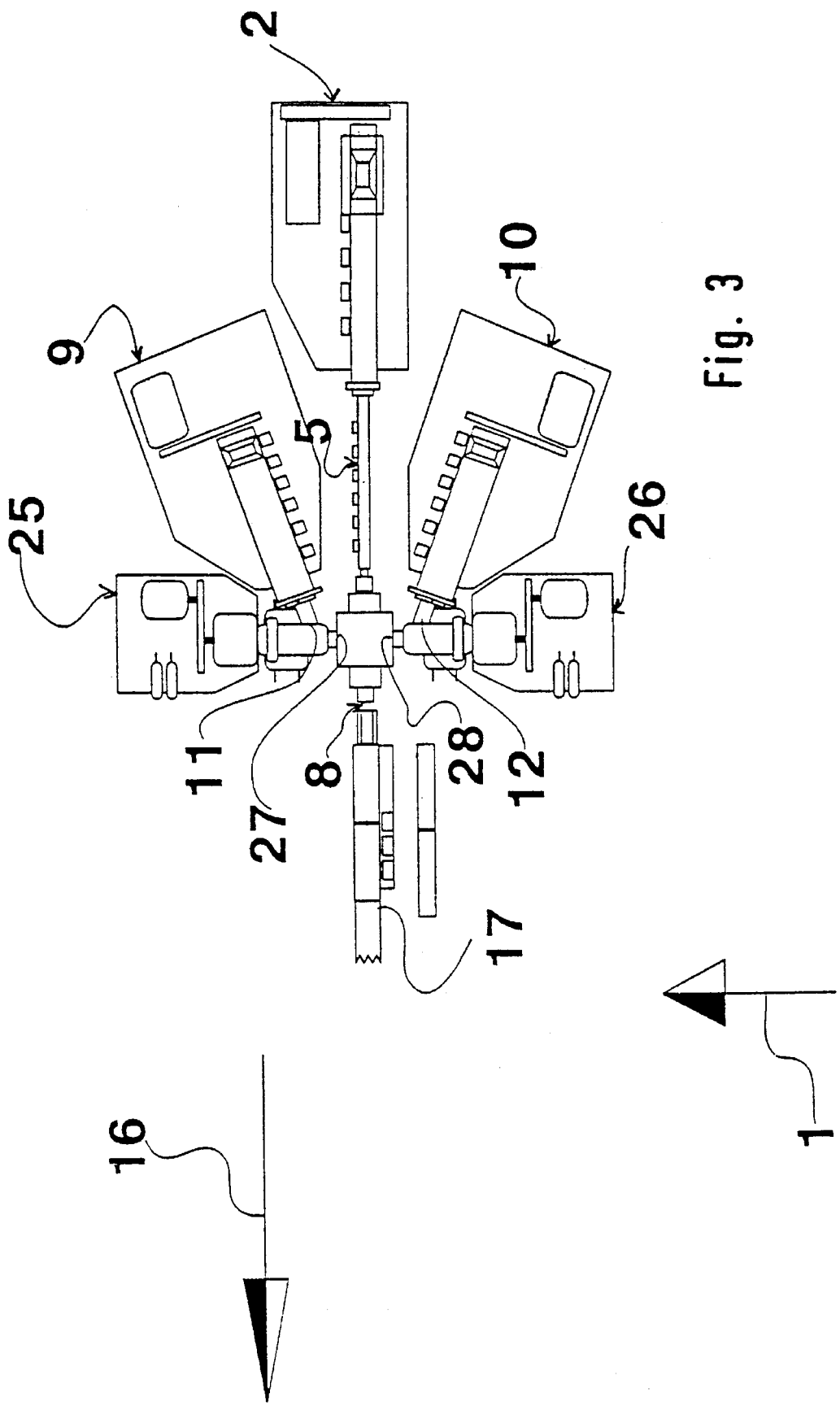
FIG. 3 is a plan view, on an enlarged scale as compared with FIG. 1, of part of a third embodiment of an apparatus for making a product in accordance with the invention.

In the embodiment shown in FIG. 3, the apparatus 1 includes respective shear heads 25 and 26 at the outlets 11 and 12 of the elastomer extruders 9 and 10. The outlets 27 and 28 of the respective shear heads 25 and 26 are connected to the inlets 13 and 14 of the multi-component extrusion head 8.

With the provision of the shear heads 25, 26 it is possible in a particularly effective way to adjust the temperature of the elastomeric material at its entry into the multi-component extrusion head 8 to the desired level. Also, in the case of the embodiment shown in FIG. 3, if needed, one or more feed devices corresponding to the feed device 21 shown in FIG. 2 can be used.

Figure 4:
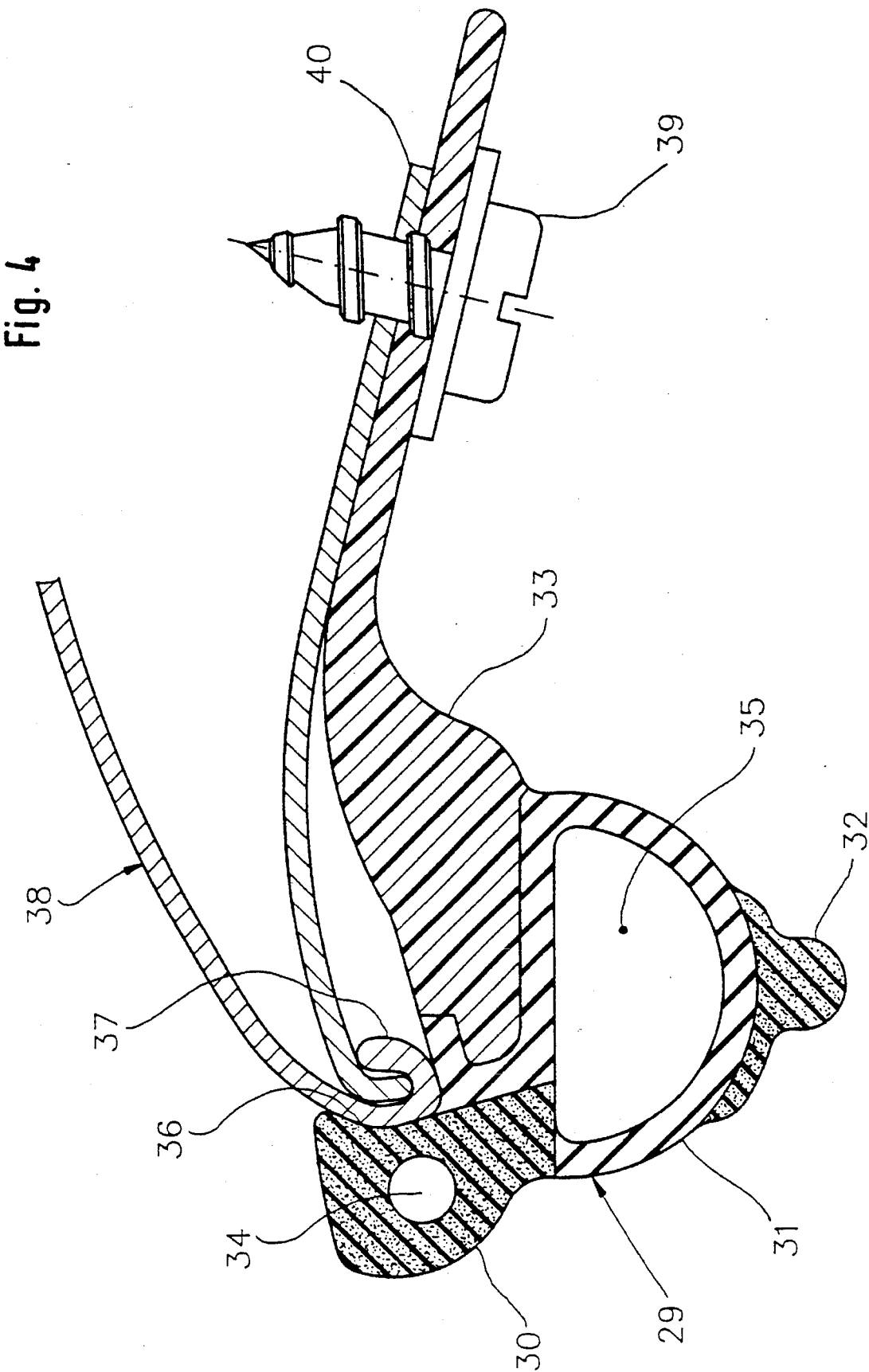
FIG. 4 is a cross-sectional view through a first embodiment of manufactured product in accordance with the invention in its installed state.

FIG. 4 shows a compound profile 29 which is made up from four profile sections 30 to 33. The profile sections 30 and 32 are of expanded rubber, with the profile section 30 being provided with a hollow chamber 34 throughout its length in order to improve its resilience properties.

The profile section 31 is likewise provided with a hollow chamber 35 running throughout its length in order to achieve optimum resilience properties. The profile section 31 consists of an elastomeric material, just as do the profile sections 30 and 32. As elastomeric materials for the profile sections 30 to 32 one can use for example the following materials:

Expanded rubber having a Shore-A hardness of 10 to 30; or

Soft rubber having a Shore-A hardness of 30 to 70;

both being made for example from EPDM, SBR, CR, ECO, blends (mixtures) of EPDM with SBR with an EPDM proportion by weight of 20 to 90%, blends of EPDM with SBR and/or polyoctenamer, or NBR.

The following thermoplastic elastomeric materials (TPE) can also be used by way of example:

TPE based on styrene ethylene butylene styrene (S-EB-S)

TPE based on styrene butadiene styrene (SBS),

TPE based on styrene isoprene styrene (SIS),

TPE based on elastomeric compositions as TPO blends or TPO alloys, for example of cross-linked EPDM/propylene blends (EPDM/PP) or Ethylene vinyl acetate/Vinylidene chloride (EVA/PVDC) or TPE based on thermoplastic polyurethanes (TPU); TPO is the abbreviation for thermoplastic polyolefin elastomers.

The profile sections 30 to 32 are each formed by an elastomer extruder which has already been described above, and subsequently are vulcanized to one another along the boundary surfaces which come into contact with each other. Thus, a chemical bond of sufficient strength is created between the respective profile sections 30 to 32.

The profile section 33 consists in contrast of a thermoplastic plastics material. The following materials can be used for this, for example:

PPE polyphenylene ether

PP polypropylene

PE (LDPE, low density PE)

PE (HDPE, high density PE)

PIB polyisobutylene

PS polystyrene

PA polyamide

PC polycarbonate

PETP polyethylene terephthalate

POM polyoxymethylene, epoxy resin, phenol formaldehyde resin

PES polyester

PPO polyphenyl ether or

PVC polyvinyl chloride.

These plastics materials can be used with or without reinforcement, for example by carbon fibers or glass fibers.

The profile section 33 is produced by a plastics material extruder 2, already described above, with subsequent calibrating and cooling regions 5, and is co-extruded with the profile sections 30 to 32 from the multi-component extrusion head 8 which has also been described above. By means of the subsequent co-vulcanization a chemical bond of sufficient strength is created between the profile sections 31 and 33.

The compound profile 29 which is thus created is held on the one hand by an anchor groove 36 at a folded edge 37 of a motor vehicle bodywork panel 38, and on the other hand by a screw 39 which penetrates through the profile section 33 and into a bodywork panel 40. Thus, with the simplest means, one achieves a stable connection of the compound profile 29 to the bodywork 38. The compound profile 29 serves for example as a sealing profile for the side parts of the roof frame of a folding top or hard top for a cabriolet or a coupé type vehicle.

FIG. 5 shows a compound profile 41 which is structured and formed substantially in the same way as the compound profile 29 shown in FIG. 4. Again the connection to the motor vehicle bodywork 38 is accomplished in the same way as in FIG. 4. The difference as compared with FIG. 4 lies in the fact that between the profile sections 31 and 33 there is now provided a layer of a coupling material 42. The purpose of the coupling material 42 is to improve the chemical bond between the elastomeric material of the profile section 31 and the thermoplastic plastics material of the profile section 33. The following materials can be used for example as the coupling material 42:

EPDM in a blend with PP, PE, PS, PIB, PES, as well as other polymers from the aforesaid listing of the materials for the profile section 33, in a proportion by weight of less than 20%, Blends of EPDM-CR-SBR-polyoctenamer or EPDM compounds with resin additions, (for example epoxy resins).

If the profile section 33 is of a TPE, then a polypropylene primer can be used for example as coupling material 42.

Figure 6:
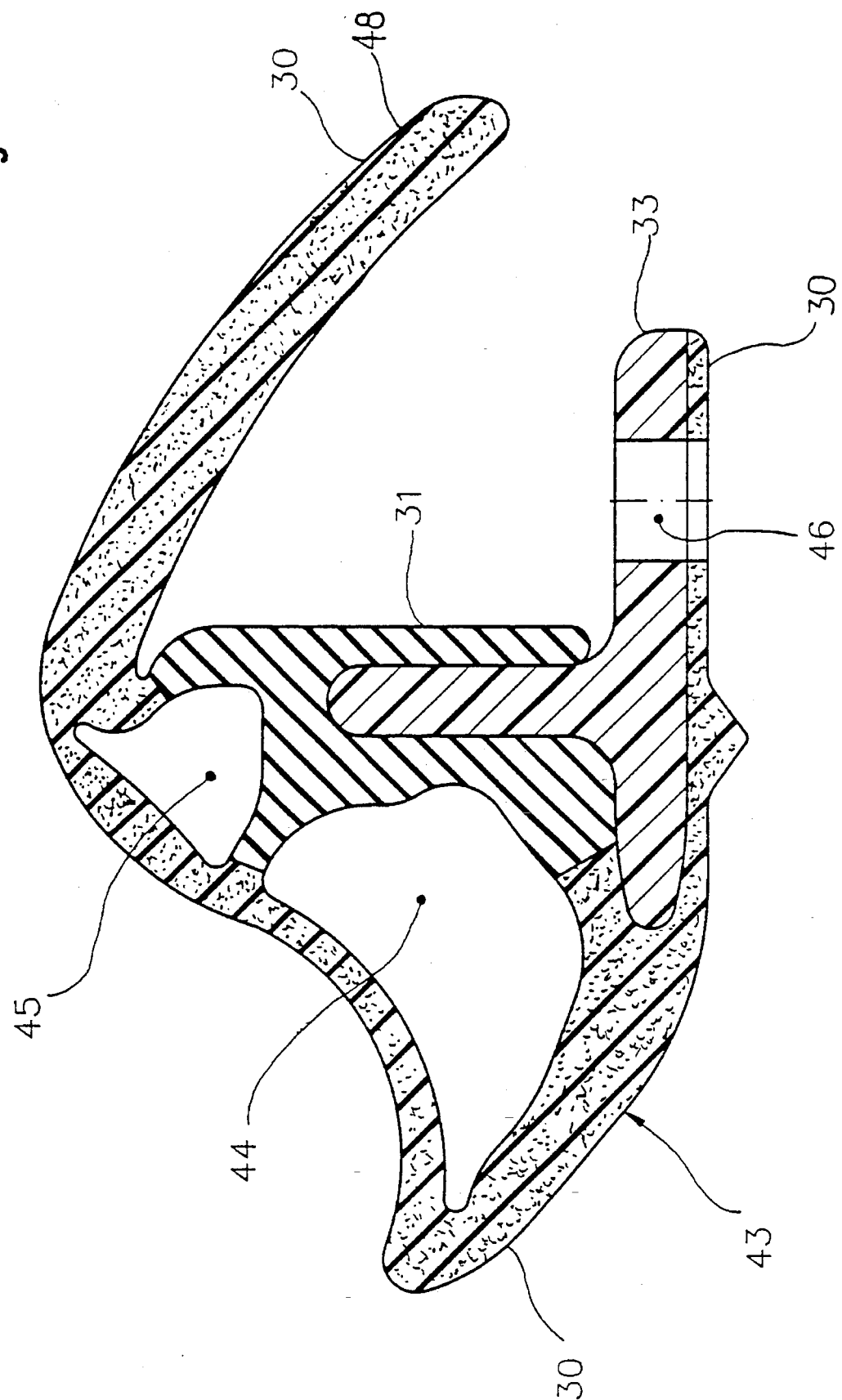
FIG. 6 is a cross-sectional view through a third embodiment of manufactured product.

FIG. 6 shows another compound profile 43, in which the profile section 30 is of expanded rubber and the compound profile 43 forms an almost complete enclosure. Within the interior of the profile section 30 is arranged the profile section 31, which likewise consists of an elastomeric material and has a chemical bond with the profile section 30 at the boundary surfaces. Between the profile sections 30 and 31 are throughgoing hollow chambers 44 and 45 to improve the elasticity properties of the compound profile 43.

The profile section 33 in FIG. 6 has a substantially T-shaped cross-section and is partially embedded in the profile sections 30 and 31. Here again, at the boundary surfaces, a sufficiently strong chemical bond is created just on the basis of the aforesaid co-extrusion and co-vulcanization.

At its lower free end the compound profile 43 shown in FIG. 6 has mounting holes 46 which are arranged spaced from one another in the longitudinal direction. These mounting holes 46 can be connected to a part of the bodywork (not shown) and have fixing elements therethrough. A lip 48 of the profile section 30 which is made of expanded rubber overlies the mounting holes 46. The compound profile 43 serves for example as a sealing profile for the front transverse section of the roof frame of a folding cover or hard top for a cabriolet or for a coupé type vehicle.

FIG. 7 shows yet another compound profile 47 which is particularly suitable as a sealing profile for the front transverse section and the side parts of the roof frame of a folding cover or hard top for a cabriolet or for a coupé type vehicle.

The compound profile 47 comprises a profile section 33 of a thermoplastic plastics material which has a substantially U-shaped cross-section. The profile section 33 is provided with a plurality of mounting holes 46 which are arranged spaced from one another in the longitudinal direction. These mounting holes each have all-round play with reference to a metal-cutting screw 39. Thus, the compound profile 47 can be displaced relative to the screws 39 within limits in the longitudinal and transverse directions during the assembly, until the optimum position for the compound profile 47 has been achieved. Then, the screws 39 are fastened in place.

One longitudinal end of the profile section 33 is formed as a first coupling member 49. A masking profile section 50 is vulcanized onto the profile section 33 on its lengthwise side which lies opposite to the first coupling member 49. The masking profile section 50 includes an additional profile section 51 of expanded rubber which is vulcanized onto a base 52 and onto a leg 53 of the profile section 33 by means of the coupling material 42. A constituent part of the masking profile section 50 is a further profile section 54 of soft rubber which overlies the profile section 33 and which has one longitudinal end vulcanized to the additional profile section 51 and has its other longitudinal end vulcanized to a coupling profile section 55. The coupling profile section 55 consists of a thermoplastic plastics material and comprises a second coupling member 57 which forms a snap closure 56 with the first coupling member 49.

A sealing profile section 58 of expanded rubber is vulcanized by means of the coupling material 42 to the side of the profile section 33 which lies opposite the additional profile section 51.

In FIG. 7 there is indicated in chain-dotted lines, at the top, the bodywork panel 40 to which the compound profile 47 is to be fitted. The toothed parts of the profile sections 51, 58 are pressed sealingly against the bodywork panel 40 and are correspondingly deformed. Until the aforementioned fastening of the metal-cutting screws 39 the snap closure 56 is free and the further profile section 54 hangs downwards out of the way of the screwdriver. After the fastening of the screws 39 the further profile section 54 with the coupling profile section 55 is folded upwards and the snap closure 56 is closed. This creates a hollow chamber 59 into which, due to a window 60 of the motor vehicle, the further profile section 54 can be deformed upon putting the roof cover in place, as is indicated by chain-dotted lines in FIG. 7.

In FIG. 7 the major part of the external surface of the additional profile section 51 and of the further profile section 54 are overlaid with a sliding layer 61 which is indicated as being comparatively thick but which in practice is just a thin coating. The sliding layer 61 reduces the sliding friction between the further profile section 54 and the window glass 60.

While preferred embodiments of the invention have been disclosed herein, the present invention is not limited to such disclosure. Changes and modifications may be incorporated and embodied within the scope of the appended claims.

What is claimed is:

1. A compound profile comprising:

a thermoplastic plastics material profile section arranged to be fixed to a bodywork panel;

an elastomeric profile section of soft rubber vulcanized to said thermoplastic plastics material profile section;

a coupling material disposed between said thermoplastic plastics material profile section and said elastomeric profile section;

said compound profile manufactured by a process for chemically bonding thermoplastic plastics material with elastomeric material by co-vulcanization, comprising the steps of:

extruding, calibrating and cooling at least one said thermoplastic plastics material to form at least one said thermoplastic plastics material profile section;

feeding said cooled thermoplastic plastics material profile section into a multi-component extrusion head;

extruding at least one said elastomeric material to form at least one said elastomeric profile section;

feeding said elastomeric profile section into said multi-component extrusion head;

feeding at least one said coupling material into said multi-component extrusion head to promote the chemical bond between said thermoplastic plastics material and said elastomeric material;

ejecting said thermoplastic plastics material profile section and said elastomeric profile section from said multi-component extrusion head as a compound profile; and wherein said compound profile is cross-linked and cooled after leaving said multi-component extrusion head.

2. A compound profile comprising:

a thermoplastic plastics material profile section arranged to be fixed to a bodywork panel;

an elastomeric profile section of soft rubber vulcanized to said thermoplastic plastics material profile section;

at least one additional elastomeric profile section of expanded rubber vulcanized to said elastomeric profile section of soft rubber, said additional elastomeric profile section of expanded rubber is arranged to be coupled to a bodywork region;

said compound profile manufactured by a process for chemically bonding thermoplastic plastics material with elastomeric material by co-vulcanization, comprising the steps of:

extruding, calibrating and cooling at least one said thermoplastic plastics material to form at least one said thermoplastic plastics material profile section;

feeding said cooled thermoplastic plastics material profile section into a multi-component extrusion head;

extruding at least one said elastomeric material to form at least one said elastomeric profile section;

feeding said elastomeric profile section into said multi-component extrusion head;

ejecting said thermoplastic plastics material profile section and said elastomeric profile section from said multi-component extrusion head as a compound profile; and wherein said compound profile is cross-linked and cooled after leaving said multi-component extrusion head.

3. A compound profile according to claim 1 wherein at least one additional elastomeric profile section of expanded rubber is vulcanized to said elastomeric profile section of soft rubber, and said additional elastomeric profile section of expanded rubber is arranged to be coupled to a bodywork region.

4. A compound profile comprising:

a thermoplastic plastics material profile section having a substantially T-shaped cross-section;

an elastomeric profile section of soft rubber vulcanized to a first part of the periphery of said thermoplastic plastics material profile section;

an additional elastomeric profile section of expanded rubber vulcanized to a second part of the periphery of said thermoplastic plastics material profile section and to said elastomeric profile section; and said compound profile manufactured by a process for chemically bonding thermoplastic plastics material with elastomeric material by co-vulcanization, comprising the steps of:

extruding, calibrating and cooling at least one said thermoplastic plastics material to form at least one said thermoplastic plastics material profile section;

feeding said cooled thermoplastic plastics material profile section into a multi-component extrusion head;

extruding at least one said elastomeric material to form at least one said elastomeric profile section;

feeding said elastomeric profile section into said multi-component extrusion head;

ejecting said thermoplastic plastics material profile section and said elastomeric profile section from said multi-component extrusion head as a compound profile; and wherein said compound profile is cross-linked and cooled after leaving said multi-component extrusion head.

5. A compound profile according to claim 4 wherein said additional elastomeric profile section encloses substantially the whole of the rest of the compound profile and has a lip extending above mounting holes which are arranged to receive fixing members which are located in said thermoplastic plastics material profile section and in another end of said additional elastomeric profile section.

6. A compound profile comprising:

a thermoplastic plastics material profile section having a substantially U-shaped cross-section and having in its base mounting holes for receiving fixing members;

a longitudinal end of said thermoplastic plastics material profile section being formed as a first coupling member;

a masking profile section being vulcanized to said thermoplastic plastics material profile section at its longitudinal side which lies opposite said first coupling member;

a free longitudinal end of said masking profile section being provided with a second coupling member which forms a snap closure with said first coupling member;

said compound profile manufactured by a process for chemically bonding said thermoplastic plastic profile section with said masking profile section, comprising the steps of:

extruding, calibrating and cooling said thermoplastic plastics material profile section;

feeding said cooled thermoplastic plastics material profile section into a multi-component extrusion head;

extruding said masking profile section;

feeding said masking profile section into said multi-component extrusion head;

ejecting said thermoplastic plastics material profile section and said masking profile section from said multi-component extrusion head as a compound profile; and wherein said compound profile is cross-linked and cooled after leaving said multi-component extrusion head.

7. A compound profile according to claim 6 wherein said masking profile section includes an elastomeric profile section of soft rubber overlying said thermoplastic plastics material profile section.

8. A compound profile according to claim 7 wherein said elastomeric profile section has a longitudinal end that is vulcanized to an additional elastomeric profile section of expanded rubber which in turn is vulcanized to said thermoplastic plastics material profile section.

9. A compound profile according to claim 6 wherein said second coupling member is formed as a coupling profile section of thermoplastic plastics material, said coupling profile section being vulcanized to said masking profile section which otherwise consists of elastomeric material.

* * * * *